US005210443A

United States Patent [19]

Kugler

[11] Patent Number: 5,210,443

[45] Date of Patent: May 11, 1993

[54] PROCESS AND APPARATUS FOR PARALLEL CONTROL OF TAPPED TRANSFORMERS

[75] Inventor: Kurt Kugler, Lappersdorf, Fed. Rep. of Germany

[73] Assignee: Maschinenfabrik Reinhausen GmbH, Regensburg, Fed. Rep. of Germany

[21] Appl. No.: 776,571

[22] Filed: Oct. 15, 1991

[30] Foreign Application Priority Data

Oct. 20, 1990 [DE] Fed. Rep. of Germany ....... 4033391

[51] Int. Cl.[5] .......................................... H02P 13/06

[52] U.S. Cl. ........................................ 307/17; 307/29; 323/206

[58] Field of Search ................... 307/130, 17, 83, 256, 307/19, 29; 323/206, 208

[56] References Cited

U.S. PATENT DOCUMENTS 4,403,292 6/1983 Ejzak et al. ......................... 364/492

FOREIGN PATENT DOCUMENTS 1156880 11/1957 Fed. Rep. of Germany .
1139918 11/1962 Fed. Rep. of Germany .
2616798 6/1978 Fed. Rep. of Germany .
2630933 7/1980 Fed. Rep. of Germany .
3032874C2 11/1982 Fed. Rep. of Germany .
3032872 5/1984 Fed. Rep. of Germany .
1535622 12/1978 United Kingdom .

OTHER PUBLICATIONS

Article "Die Parallelsteuerung von Transformatoren mit Stufenschalter" by Friedrich Maier (Siemens periodical; Feb. 1956, Issue 2).

*Primary Examiner*—A. D. Pellinen
*Assistant Examiner*—Aditya Krishnan
*Attorney, Agent, or Firm*—Herbert Dubno

[57] ABSTRACT

A process for parallel control of tap transformers in which individual voltage regulators of parallel operating transformers are connected to a single parallel processor by serial data lines and the measured values of the voltage and current amplitudes and the phase angles are transmitted by the voltage regulators to the parallel processor, an interference variable for each voltage regulator is calculated in the parallel processor from the partial load current and the circulating reactive current and is transmitted with the partial load current by the serial data lines to the voltage regulators, and each voltage regulator then calculates an LDC variable for load drop compensation, by summing the measured voltage, the received interference variable and the LDC variable provides a controlled variable or voltage value which constitutes the new set point with respect to which the voltage regulator then controls the transformer to which it is assigned.

4 Claims, 4 Drawing Sheets

PROCESS AND APPARATUS FOR PARALLEL CONTROL OF TAPPED TRANSFORMERS

FIELD OF THE INVENTION

My present invention relates to a process for the parallel control of tapped transformers, i.e. transformers provided with tap changers and connected in parallel. The invention also relates to a system for the control of such transformers.

More particularly, the invention relates to the parallel control of the tap changers of tapped transformers which can be combined in selected or desirable switching combinations in a two bus-bar system which can have the tap changers switchable under load and whereby the respective settings of the breaker isolating disconnecting) switch and the section (power stage) switch can be determined from indication (pilot or signalling) contacts and wherein each tap transformer is provided with a voltage regulator individual thereto which can operate a motor drive or the like for the tap changers.

BACKGROUND OF THE INVENTION

Processes for the control of the parallel operation of tapped transformers are known in a variety of forms. When the tap transformers to be switched in parallel are identical with respect to their voltage stages and number of taps, the control process can be relatively simple. In this case, it is only important to be certain that all of the tap transformers are set to the same voltage stages so that the circulating reactive current will be zero or a minimum. In other words, where the voltage stages are not all set identically for the parallel transformers, a circulating reactive current will flow between the secondary windings of the transformers. Reference may be had in this regard to German open application DE 11 39 918.

An Austrian patent AT 126 517 teaches the provisions of auxiliary switches for such control and which have the same number of contacts as the tap changers.

More complicated control processes are required when the parallel-operating tap transformers are controlled for different voltage stages and numbers of taps. A much more sensitive control is required in these cases.

The control processes for such systems can be divided into two groups.

In one group of control systems represented, for example, by German patent document 11 56 880 and termed the "master-slave" process, a synchronous control is realized by selecting one of the tap transformers as the master and controlling the remaining tapped transformers as slaves which are controlled for response to the settings of the master transformer. This process is not, of course, a true parallel control since at least the master transformer cannot truly be said to be controlled in parallel to the remaining transformers.

The second process is a true parallel control whereby all of the tapped transformers are controlled in parallel and in the identical manner.

From the Siemens Journal 1956, No. 2, pages 100 ff, entitled, *The Parallel Control of Transformers with Tap Changers* ("Die Parallelsteuerung von Transformatoren mit Stufenschalter"), a control unit is known in which each tap changer is provided with a control device. A similar system is described in German patent DE 30 32 874.

In the operating instructions No. 63/82, dated October 1988 of Maschinenfabric Reinhausen GmbH, the present assignee, automatic parallel control utilizing the circulating current method is described and this system provides each tap transformer with a respective voltage regulator and parallel controller.

In the process utilized by this system, the voltage regulators measure the respective voltages by means of voltage converters and the respective parallel controller connected to each voltage regulator can be provided for tap control when the sum of the voltages corresponds to the nominal voltage.

The parallel control units in this process thus generate a control variable which is proportional to the circulating reactive current of the respective tapped transformer and influences the voltage regulator thereof. Such circuitry and the process by which it operates has been found to be practical for a control in which the bus bar is used. When, however, based upon logic combinations, tap transformers are connected to a two bus-bar system, the process becomes very complicated and numerous error possibilities can arise.

This is because there are numerous cross connections possible between the parallel control units and the indication or auxiliary signal contacts used for determining the system configuration.

These problems increase when increasing numbers of tap transformers to be connected in parallel because of the still more rapid increase in the number of switching combinations or variations with increasing numbers of tapped transformers. As a consequence, parallel control by this earlier system has been found to be impractical for the two bus-bar arrangement where large numbers of tap transformers are to operate in parallel and are to be selectively interconnected by logic switching.

OBJECTS OF THE INVENTION

It is, therefore, the principal object of this invention to provide an important process for parallel control of a multiplicity of tap transformers operating in a two bus-bar system which is universally applicable regardless of the number of transformers so provided and which can provide parallel control without cross connection and while permitting selective interconnections of the transformers with the bus bars.

Another object of the invention is to provide an process of this type which allows parallel control at a minimum cost.

It is also an object of the present invention to provide a parallel control system for carrying out the improved process.

SUMMARY OF THE INVENTION

These objects and others which will become apparent hereinafter are attained, in accordance with the invention, in a process for parallel control in selected switched combinations of tap changers of a plurality of mutually parallel transformers switchable under load, the transformers having breaker and section switches in a two bus-bar system with configurations representing respective settings of the transformers, each transformer further having a motor for driving the respective tap changer and a respective voltage regulator individual to the respective transformer and responsive to an output of the respective transformer and operatively coupled with the respective motor, the process comprising the steps of:

(a) detecting in a parallel processor the respective configurations of the breaker and section switches from indication contacts thereof, thereby determining the respective settings of the tap changers of the transformers;

(b) measuring in the voltage regulators actual values of amplitude and phase angle of voltage and current outputs of the respective transformer and supplying the values by serial data lines to the parallel processor;

(c) automatically calculating in the parallel processor from the values and the settings of the respective transformers, a partial load current and a circulating reactive current for each transformer and, from the partial load currents and circulating reactive currents, an interference variable for each voltage regulator;

(d) transmitting each partial load current and the respective interference variable to the respective voltage regulator from the parallel processor by the serial data lines;

(e) from the partial load current and respective interference variable transmitted to each voltage regulator by the serial data lines from the parallel processor, automatically calculating in each voltage regulator an LDC variable for load-drop compensation; and (f) summing in each voltage regulator the respective measured voltage, interference variable and LDC variable to produce a controlled variable and regulating the respective transformer therewith.

With the invention, therefore, only a single parallel controller is provided.

According to a feature of the invention, the serial data lines are provided with a ring data line and connected to the voltage regulators and the parallel controller by appropriate interfaces.

The process of the invention can be realized with relatively simple equipment, preferably a microprocessor controlled parallel controller which is serially connected with the individual voltage regulators. The latter is known from the prior art teachings discussed above, each individual to the respective tapped transformers for controlling same. With the serial data lines of the invention, there is a significantly reduced probability of wiring errors or other defects.

The hitherto required connections to the motor drive for determining the tap changer settings can be eliminated as well.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 2:
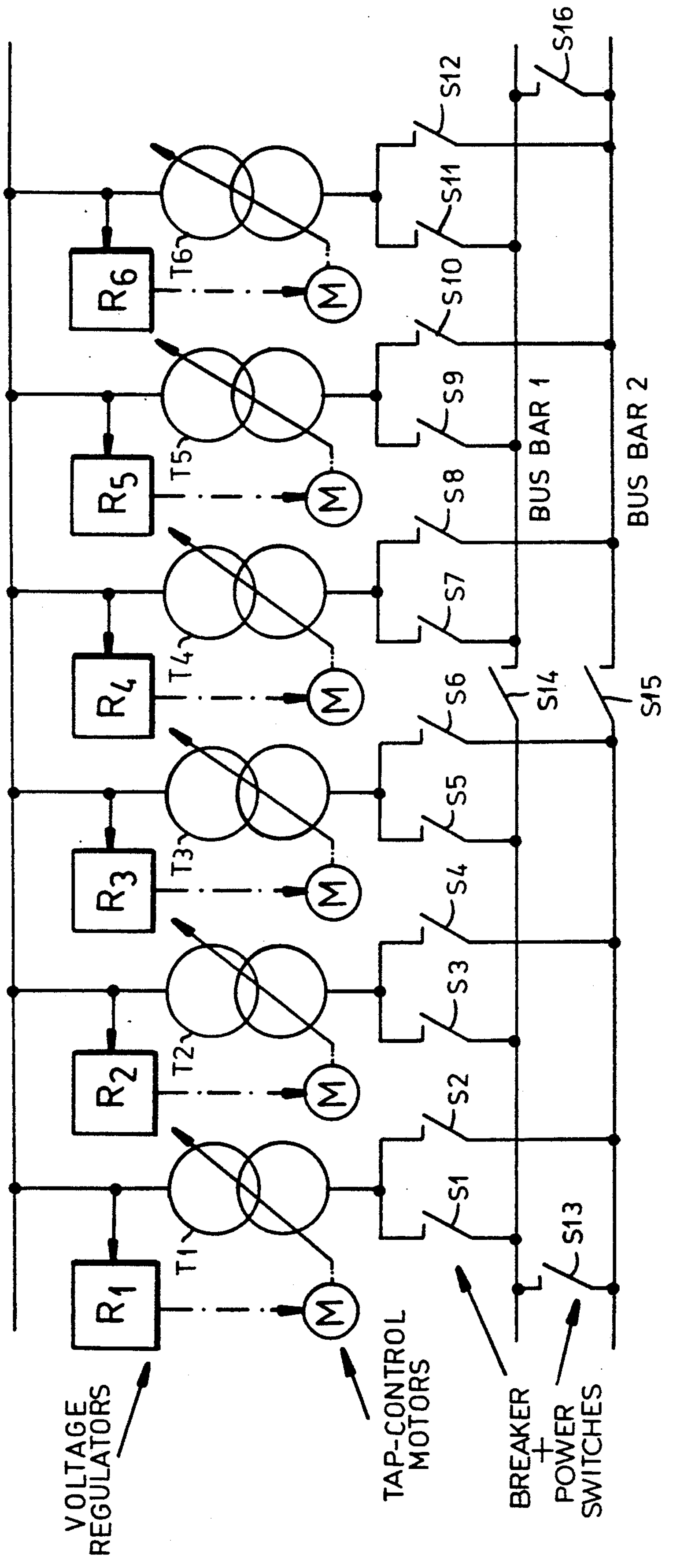
FIG. 2 is a diagram illustrating connection of the transformers of, for example, six parallel-operating tap transformers to two bus bars of a two bus-bar system.

By means of the indicating contacts S1 . . . S16 of the respective breaker and power switches, information is provided to a single parallel controller P of the actual tap transformer configurations, i.e. information as to which of the tapped transformers are connected at any point in time to which of two bus bars identified in FIG. 2 as bus bars 1 and 2.

It will be apparent that with the switches of these contacts S1–S16, the tap transformers T1 . . . T6 can be connected with the bus bars 1 and 2 in all imaginable switch combinations by the logic selection of the conductive switches.

Each tap transformer T1–T6 is provided with a respective voltage regulator R1 . . . R6 individual thereto and these voltage regulators can control the tap changers represented at M as described in operating instructions No. 63/82 or UK patent 1,535,622 corresponding to German patent DE 26 16 798.

Each voltage regulator R1–R6 can measure the voltage amplitude U, the current amplitude R and the phase angle at each tapped transformer and feed these values in succession over the data lines D1 . . . D6 to the parallel processor P which, as noted, is microprocessor controlled.

For each voltage regulator R1 . . . R6, moreover, the partial load current and the circulating reactive current are individually determined and from these values, an interference variable is calculated for each voltage regulator R1 . . . R6, thereby enabling the voltage regulator to control the respective transformer (see Operating Instructions No. 63/82, for example).

The interference variables and the partial load currents thus calculated in the parallel processing are transmitted via the data line D1 . . . D6 to the respective voltage regulators R1 . . . R6. In each voltage regulator R1 . . . R6, an LDC variable is generated by the line drop compensation (LDC) method (see UK 1,535,622). The line voltage drop is therefore compensatable. Line drop compensation is also described in German patent document DE 26 30 933 and line drop compensation can, if desired, be calculated from the parameters available at each voltage regulator by appropriate programming thereof.

Finally for each voltage regulator R1 . . . R6, the measured voltage U, the interference variable supplied by the parallel controller and the LDC variable for compensation of the line voltage drop are added to form a new value, referred to above as the controlled variable, utilized as the control point for the voltage regulator and as to which the transformer is thereupon operated in response.

Figure 1:
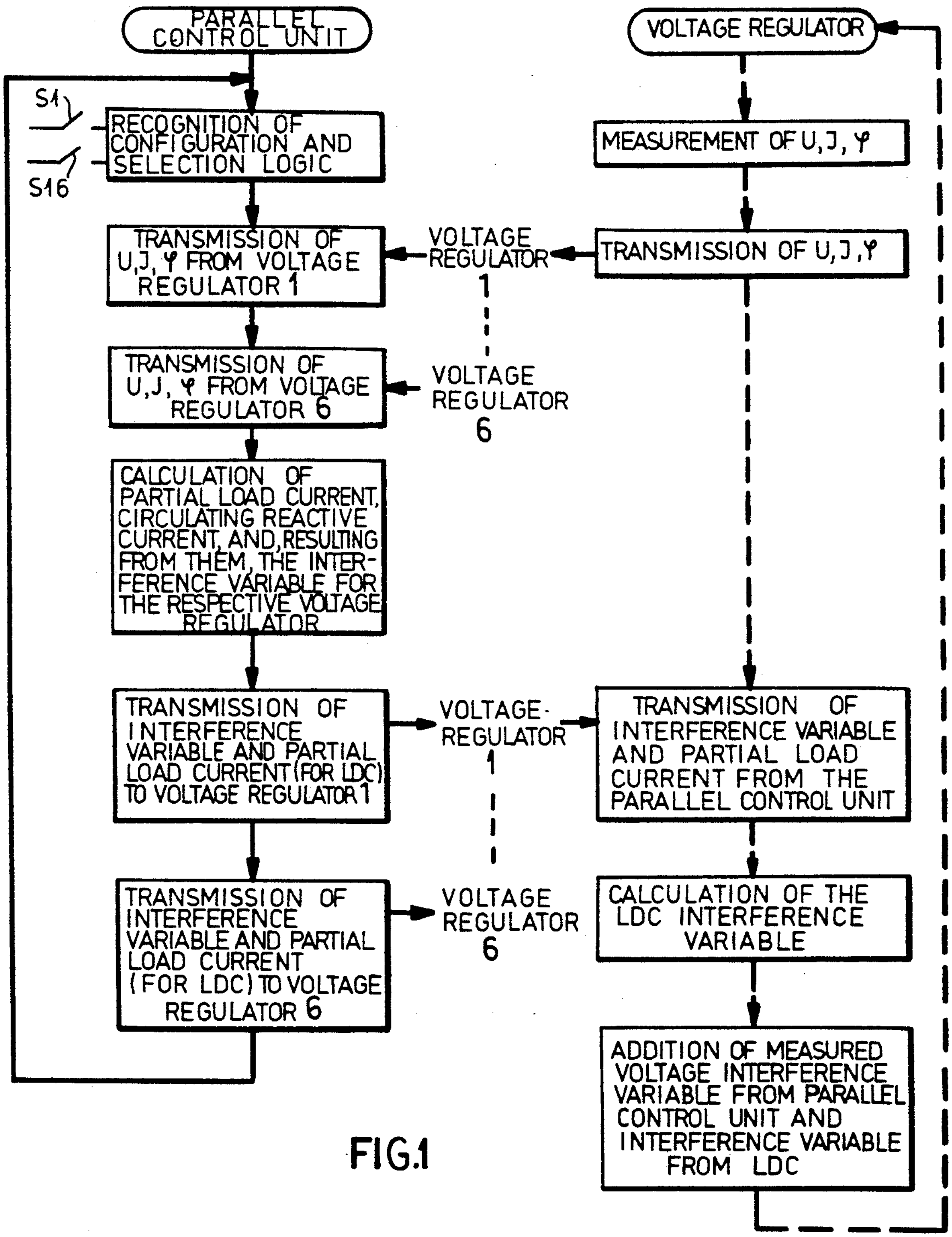
FIG. 1 is a diagram of an algorithm for carrying out the process of the invention.
Figure 3:
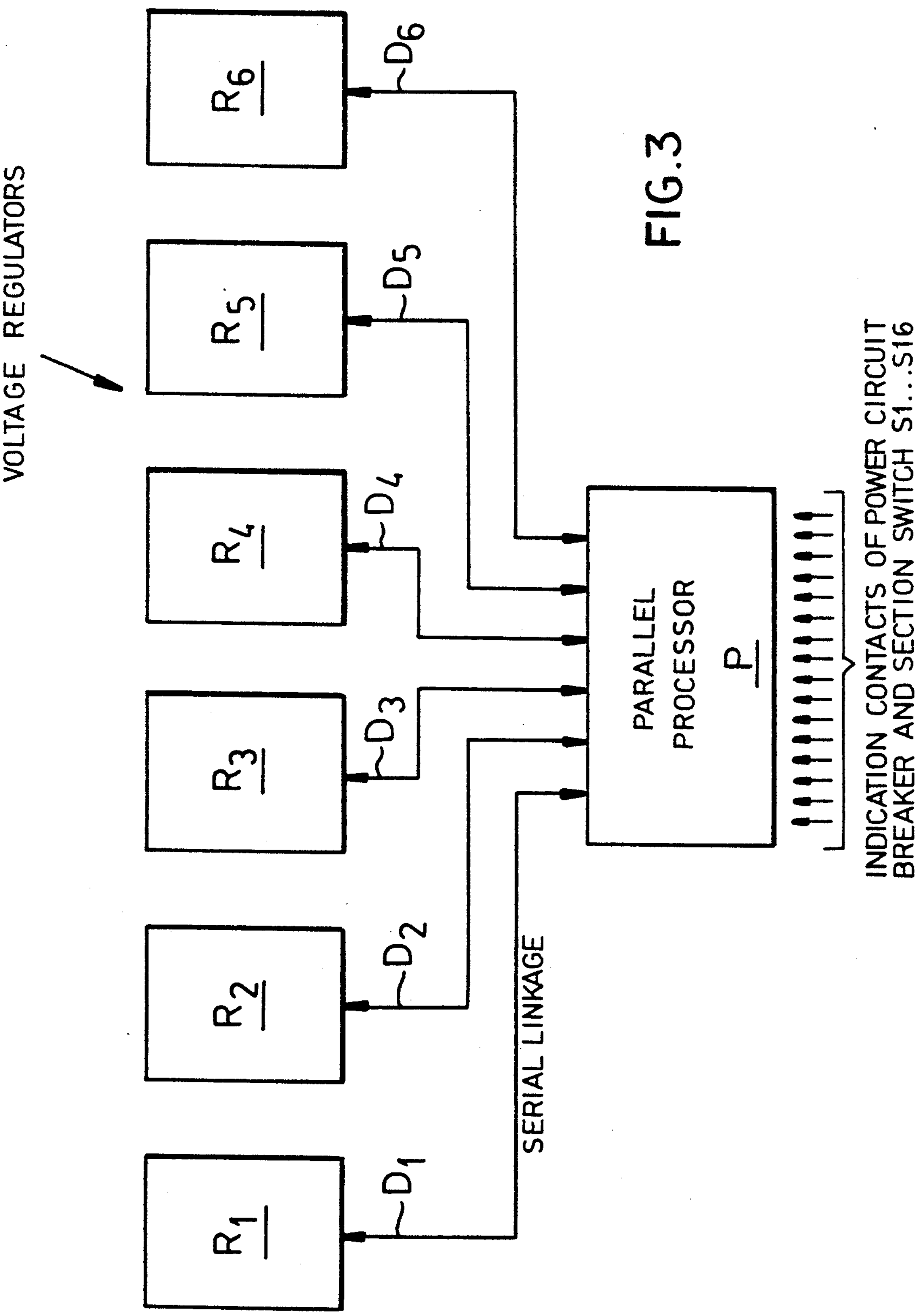
FIG. 3 shows the serial connection of the voltage regulators of the six transformers to the single parallel controller in one embodiment of the invention and in block diagram form.
Figure 4:
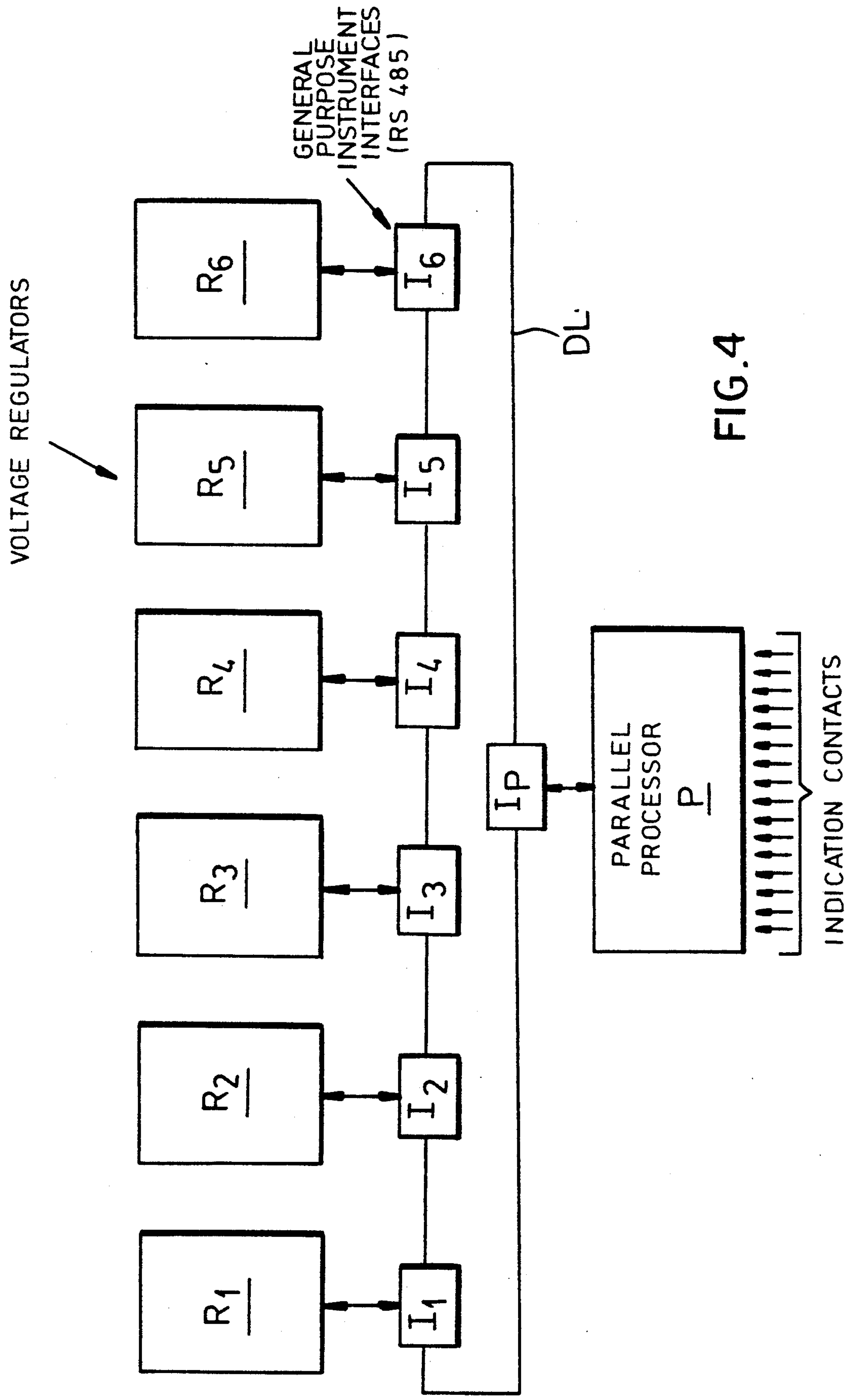
FIG. 4 is a block diagram of an alternative embodiment of the serial connection.

As an alternative to the system described in connection with FIG. 3, the voltage regulators of FIG. 4 are each provided with an interface $I_1 \ldots I_6$ of the general purpose instrument type RS 485 and another interface $I_T$ is provided for the parallel processor P so that the ring data line DL can be used as the serial data line in place of the point to point connection of FIG. 3. The operation of this system is otherwise identical to that of FIG. 3 and represented by the algorithm of FIG. 1.

I claim:

1. A process for parallel control in selected switched combinations of tap changers of a plurality of mutually parallel transformers switchable under load, said transformers having breaker and section switches in a two bus bar system with configurations representing respective settings of the transformers, each transformer further having a motor for driving the respective tap changer and a respective voltage regulator individual to the respective transformer and responsive to an output of the respective transformer and operatively coupled with the respective motor, said process comprising the steps of:

(a) detecting in a parallel processor the respective configurations of said breaker and section switches from indication contacts thereof, thereby determining the respective settings of the tap changers of said transformers;

(b) measuring in said voltage regulators actual values of amplitude and phase angle of voltage and current outputs of the respective transformer and supplying said values by serial data lines to said parallel processor;

(c) automatically calculating in said parallel processor from said values and said settings of the respective transformers, a partial load current and a circulating reactive current for each transformer and, from the partial load currents and circulating reactive currents, an interference variable for each voltage regulator;

(d) transmitting each partial load current and the respective interference variable to the respective voltage regulator from the parallel processor by said serial data lines;

(e) from the partial load current and respective interference variable transmitted to each voltage regulator by said serial data lines from said parallel processor, automatically calculating in each voltage regulator an LDC variable for load-drop compensation; and (f) summing in each voltage regulator the respective measured voltage, interference variable and LDC variable to produce a controlled variable and regulating the respective transformer therewith.

2. The process defined in claim 1 wherein the serial data lines are formed as a ring data line.

3. A system for parallel control in selected switched combinations of tap changers of a plurality of mutually parallel transformers switchable under load, said transformers being breaker and section switches in a two bus-bar system with configurations representing respective settings of the transformers, each transformer further having a motor for driving the respective tap changer, said system comprising:

a respective voltage regulator individual to the respective transformer and responsive to an output of the respective transformer and operatively coupled with the respective motor;

a single parallel processor receiving inputs representing respective configurations of said breaker and section switches from indication contacts thereof, thereby determining respective settings of the tap changers of said transformer; and data lines serially connecting said parallel processor with all of said voltage regulators whereby actual values of amplitude and phase angle of voltage and current outputs of a respective transformer measured in said voltage regulators are supplied by serial data lines to said parallel processor and a partial load current and a circulating reactive current are calculated in said parallel processor and an interference variable is generated in said parallel processor for each voltage regulator and is transmitted to the respective voltage regulator by said serial data lines, each of said voltage regulators being constructed and arranged for calculating an LDC variable for load drop compensation from a respective partial load current and respective interference variable, and each transformer is controlled by the respective voltage regulator with a controlled variable formed by summing in the respective voltage regulator the voltage amplitude measured thereby, the interference variable transmitted thereto by said serial data lines and the LDC variable calculated therein.

4. The system defined in claim 3 wherein said data lines form a ring data line connected to said voltage regulators by respective interfaces.

* * * * *